Jan. 5, 1943.  G. W. PENNEY  2,307,603
ELECTRICAL PRECIPITATOR WITH AUTOMATIC DUST REMOVAL
Filed Feb. 18, 1942  3 Sheets-Sheet 2
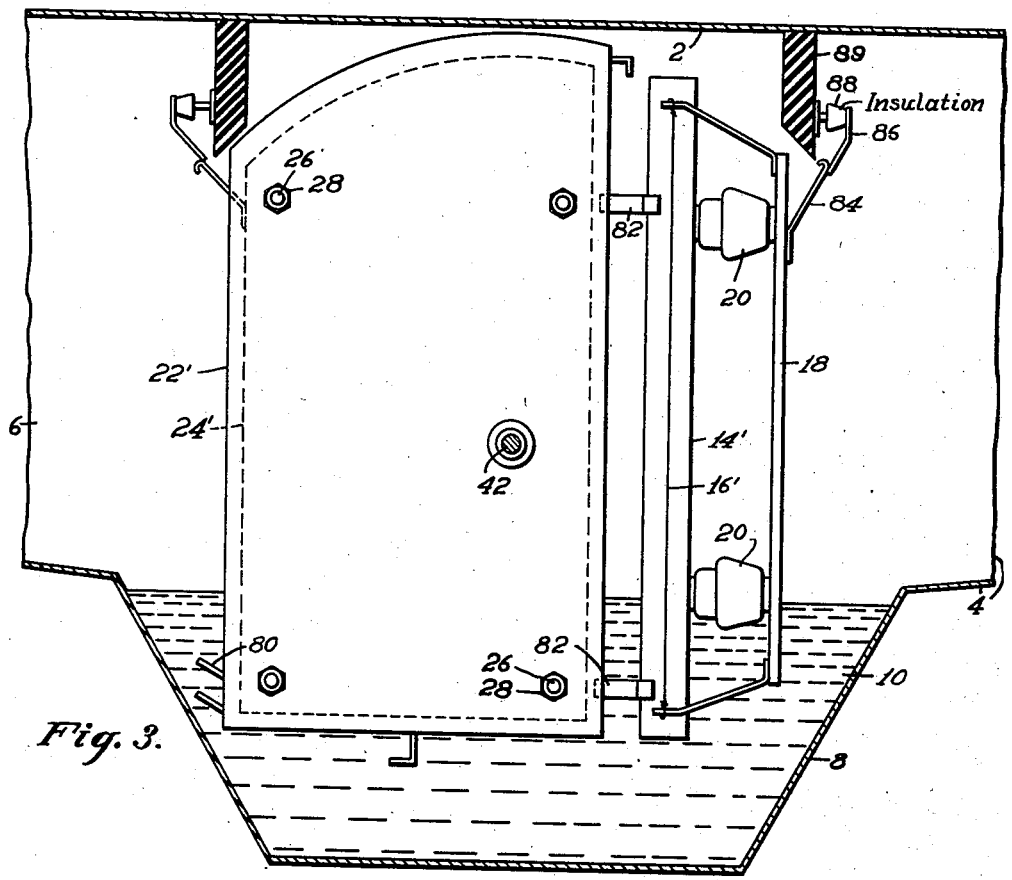
Fig. 3.
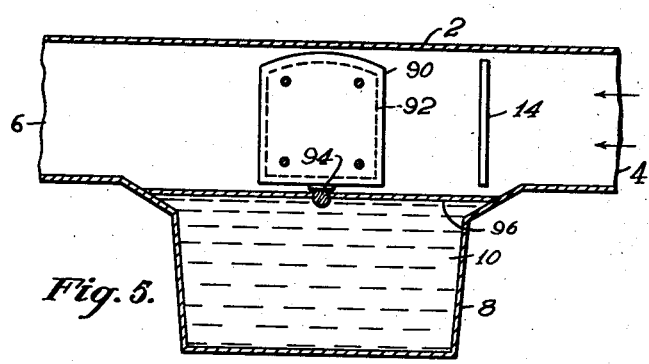
Fig. 4.
Fig. 5.
WITNESSES:
Edward Michaels
Bernard L. Zangwill
INVENTOR
Gaylord W. Penney.
BY O.B. Buchanan
ATTORNEY

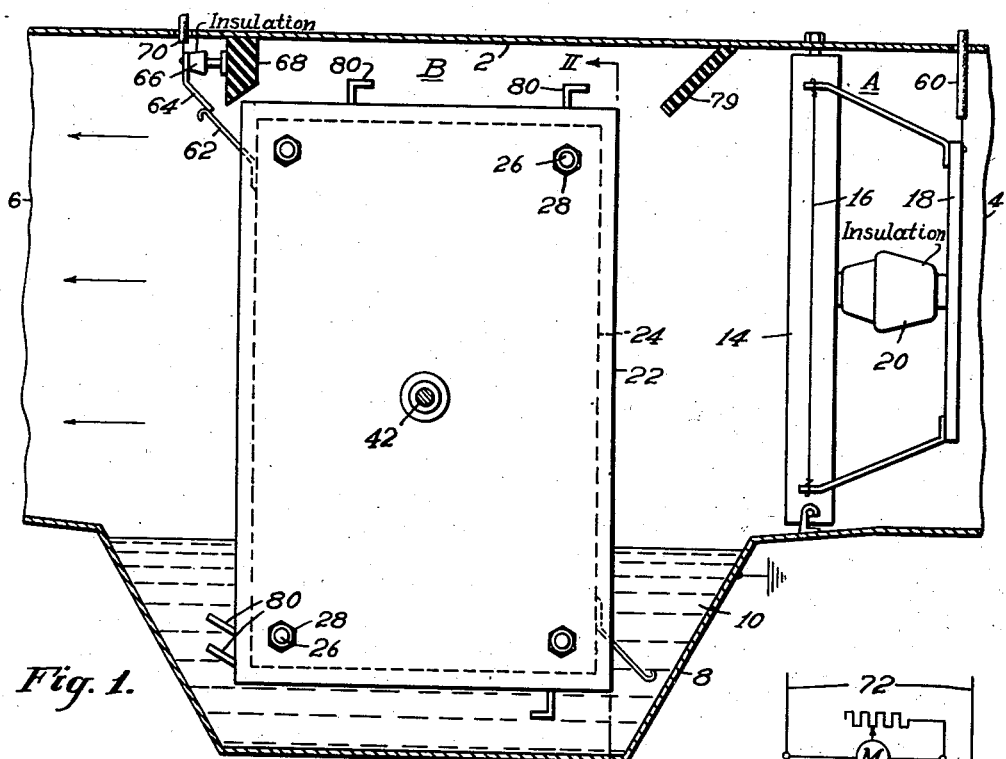

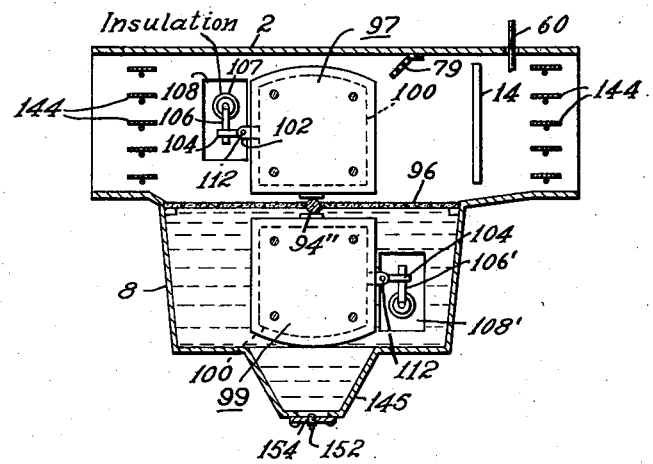
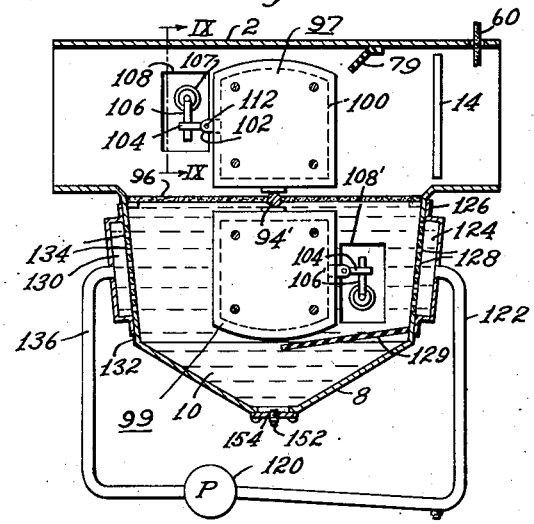
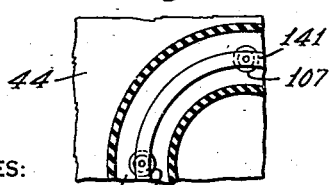
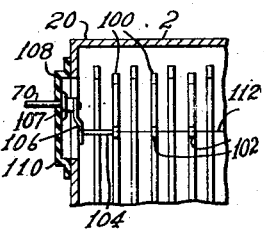
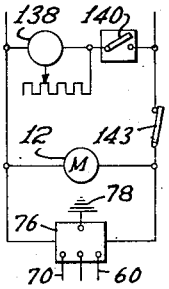

Patented Jan. 5, 1943

2,307,603

UNITED STATES PATENT OFFICE 2,307,603

ELECTRICAL PRECIPITATOR WITH AUTOMATIC DUST REMOVAL

Gaylord W. Penney, Wilkinsburg, Pa., assignor to Westinghouse Electric & Manufacturing Company, East Pittsburgh, Pa., a corporation of Pennsylvania Application February 18, 1942, Serial No. 431,391

22 Claims. (Cl. 183—7)

My invention relates generally to electrostatic gas-cleaning precipitators which collect dust on dust-precipitating electrodes and then remove precipitated dust from the electrodes; and more particularly relates to such a precipitator having a plurality of alternately relatively insulated and uninsulated spaced dust-precipitating or collecting electrodes having spaced dust-collecting surfaces which are relatively extensive in area in the gas-flow direction in comparison with the spacing between the surfaces and the thickness of the electrodes. By dust or dust-particles I mean foreign particulate matter of any type or kind carried in the gas and which is generally recognized as removable by electrical precipitator means.

This application is a continuation-in-part of my application Serial No. 362,535, filed October 24, 1940.

Dust left on oil-coated dust-precipitating electrodes has a tendency to cake and bind itself to the electrodes, the dust-deposit increasing in thickness and becoming more difficult to remove with time. Such dust-deposits or dirt layers reduce the gas-cleaning efficiency of the precipitator, introducing the equivalent of a high resistance in the energizing circuit for the relatively insulated dust-precipitating electrodes. Such deposits or layers also obstruct gas-flow and increase the frequency of flashovers and spitting to the detriment of the power-pack, or the equivalent, providing the necessary form of power for the precipitator.

It is an object of my invention to provide a precipitator of the type described which will be consistently highly efficient for gas-cleaning; which will always have relatively clean dust-precipitating electrodes; and which will not subject its power-pack, or the equivalent, to undue loads or burdens.

It is an important object of my invention to provide a gas-cleaning precipitator of the type described with means for occasionally or periodically removing the precipitated dust layer from the dust-collecting surfaces of the dust-precipitating electrodes by force-actions tending to forcibly separate or tear the collected dirt from the dust-collecting surfaces, so that the dust-collecting surfaces are adequately cleaned after each cleaning operation to provide, in effect, substantially dirt-free dust-collecting surfaces.

It is an important object of my invention to provide an improved electrical dust-precipitator with means for removing the accumulated dust from the dust-collecting surfaces of the dust-precipitating electrodes by forceful washing or flushing the accumulated dust from dust-collecting surfaces with a cleaning liquid, the liquid preferably being oil which leaves a thin film on the cleaned dust-collecting surfaces. The dust-collecting surfaces are preferably planar with the planes upwardly directed so that the washing or cleaning liquid will readily drain from them while they are moving or stationary.

It is a further object of my invention to provide an efficient gas-cleaning electrostatic precipitator of the type described having a gas-cleaning section in which the dust-particles are precipitated from the gas flowing therethrough onto the dust-collecting surfaces of the dust-precipitating electrodes, and having an electrode-cleaning section in which the dust layer deposited on the dust-precipitating electrodes in the gas-cleaning section, can be effectively removed. The electrode-cleaning section is preferably out of the gas stream. In certain embodiments of my invention, the dust-precipitating electrodes have dust-collecting surfaces which are movable from the gas-cleaning section of the precipitator to the electrode-cleaning section of the precipitator, and back to the gas-cleaning section. In the electrode-cleaning section, the layer of dust on the dust-precipitating electrodes is removed by a liquid which moves relative to the electrodes, the liquid being supplied in sufficient quantity and moving at such relative velocities that the dust layer is removed from the dust-collecting surfaces by a washing and flushing action sufficient to rub or wipe the dust layer from the electrodes, the action being in the nature of rapid erosion. The dust-precipitating electrodes are moved edgewise relatively to the liquid which is in sufficient quantity to substantially fill the spaces between the spaced dust-collecting surfaces of the dust-precipitating electrodes so that, in conjunction with the relative movement of the dust-collecting surfaces and the cleaning liquid, a more thorough and effective removal of the dust layer from the dust-collecting surfaces of the electrodes is obtained.

Other features, objects and innovations of my invention will be apparent from the following description thereof which is to be read in conjunction with the accompanying somewhat diagrammatic drawings which depict the essential features of my invention. In these drawings, in which like numerals represent like parts:

Figure 1 is a vertical section view of one form of a gas-cleaning precipitator embodying my invention. In this embodiment the dust-precipitating electrodes are moved relatively to the cleaning liquid by moving them edgewise through a body of the liquid contained in a container in the electrode-cleaning section of the precipitator;

Fig. 2 is a vertical sectional view, transverse to Fig. 1, along the lines II—II of Fig. 1;

Fig. 3 is a vertical sectional view of a modified form of a gas-cleaning precipitator embodying my invention;

Fig. 4 is an elevational view illustrating a detail which is employed in the construction of the embodiment of Fig. 3;

Fig. 5 is a vertical sectional view of a further modified form of a gas-cleaning precipitator embodying my invention;

Fig. 6 is a schematic wiring diagram illustrating electrical connections for energizing and operating a gas-cleaning system incorporating my invention.

Figs. 7 and 8 are vertical sectional views of still other forms of gas-cleaning precipitators embodying my invention. In the embodiment of Fig. 7, the dust-precipitating electrodes can be moved relatively to the cleaning liquid by causing a flow of the liquid between and across their dust-collecting surfaces which are preferably maintained stationary while they are being cleaned.

Fig. 9 is a vertical sectional view on the line IX—IX of Fig. 7, illustrating a detail by means of which the relatively insulated dust-precipitating electrodes can be electrically energized;

Fig. 10 is a schematic wiring diagram illustrating electrical connections for energizing and operating certain embodiments of the precipitators shown; and Fig. 11 is a partial elevational view of a contact means through which the insulated plates may be charged.

While my invention is utilizable generally with any suitable type of electrical precipitator which cleans a gas by charging gas-borne dust-particles and precipitating charged dust-particles upon oppositely-charged dust-collecting surfaces extending in the general direction of gas-flow therebetween, I prefer to utilize precipitators of the two-zone type in which the dust-particles in the gas are charged in one zone, and the charged dust-particles removed in a second zone. A precipitator of this type, especially useful for cleaning the air, is shown in my Patent No. 2,192,783, granted September 13, 1938, and assigned to the Westinghouse Electric & Manufacturing Company.

Such two-zone precipitators comprise an ionizing zone which includes a plurality of spaced non-discharging electrodes, which may be curved, between which and insulated therefrom are disposed ionizing electrodes, usually in the form of wires; and a precipitating zone which includes a plurality of relatively insulated and uninsulated dust-precipitating electrodes, usually in the form of flat or bent plates, having a plurality of dust-collecting surfaces spaced to provide separated narrow passages, or strata. Electrostatic fields are established in these passages through which the gas flows so that the charged dust-particles are caused to migrate to an oppositely charged dust-precipitating electrode and deposit on its dust-collecting surface. Preferably, unidirectional fields are utilized in the two zones; the direct-current voltages for energizing the electrodes to establish such fields being usually obtained by converting available commercial alternating-current through a suitable transformer and rectifier means. When such a precipitator is used for cleaning air, its electrodes are usually energized by a limited-energy transformer and rectifier means, and the ionizing wires are less than 32 mils in size in order to obtain adequate charging of the dust-particles without any significant generation of objectionable or destructive gases.

For individually built and designed gas-cleaning systems, the length and width of the dust-collecting surfaces of the dust-precipitating electrodes, and the spacing between such surfaces depend largely on the gas-flow volume that the precipitator is expected to clean at a rated efficiency; but such surfaces need not necessarily be flat nor completely continuous. In practice, however, one or a few standard unit-precipitators are provided, and a sufficient number of them assembled in each system to handle the volume of gas to be cleaned.

The degree and length of time a dust-particle will cling to a dust-collecting surface of opposite polarity depend on a large number of factors, some dust-particles clinging for long times and others for relatively short times. In many instances, it has been found desirable to provide the dust-collecting surfaces with a film or coating of a substance which will cause the precipitated dust-particles to cling or adhere to them somewhat strongly, so that the dust will not be blown off by the gas-stream, but not so tenaciously as to prevent removal of the layer of dust on the dust-collecting surfaces, which should be done occasionally or periodically in order to maintain the gas-cleaning efficiency of the precipitator. Ordinary lubricating oil, which is clean, is useful and economical for both coating and cleaning the dust-collecting surfaces, although any other suitable liquid which has a suitable adhesive characteristic can be used. It is, however, desirable to use a clean non-odorous insulating liquid having a low vapor pressure, a high flash-point and a suitable viscosity. Other considerations in the choice of a suitable liquid involve the particular construction of the precipitator device, the type of dust that is expected to be precipitated and the character of the gas being cleaned. A good quality motor oil or a mineral oil treated with oxidation inhibitors is satisfactory for both cleaning and coating the dust-collecting surfaces of air-cleaning precipitators. Hereinafter in the specification, I use the term "oil" for convenience for designating the liquid used to clean the dust-collecting surfaces of the precipitator.

The precipitator unit of Fig. 1 comprises a metal housing or conduit means 2, generally rectangular in cross-section, provided with a gas-cleaning section through which the gas flows to be cleaned, and an electrode-cleaning section in which the collected precipitated dust is removed from the dust-precipitating electrodes. The gas-cleaning section has a gas-inlet 4 and a gas-outlet 6 which may be open or connected to ducts of an air-conditioning or ventilating system. The electrode-cleaning section includes a depressed bottom portion in the form of a tank or container 8, out of the gas-stream, for holding a quantity of oil 10. The bottom part of the housing 2, which is adjacent to the container 8, may be sloped downwardly to direct any liquid splashing thereon back to the container, although any suitable open louver or movable vane structure may be used at the ends of the gas-cleaning section for such purpose.

An ionizing zone A and a precipitating zone B are arranged successively in the direction of the gas-flow in the gas-cleaning section of the precipitator. The gas-flow is indicated by the arrows and may be created in any manner, as for example, by a blower driven by a motor 12.

The ionizing zone includes an ionizing means in the form of a plurality of spaced tubular non-discharging field-establishing ground electrodes 14 between which are insulatedly disposed ionizing wires 16. One or more ionizing wires are preferably supported by a skeleton frame 18 attached to one or more insulators secured to a ground electrode 14, as more particularly described in detail in Patent No. 2,215,298, granted September 17, 1940, to E. H. R. Pegg, and assigned to the Westinghouse Electric & Manufacturing Company. As many ground electrodes and ionizing wires are utilized as the size of the precipitator-unit requires. The ground electrodes may be fastened to the housing means in any suitable manner.

The precipitating zone B is above the oil 10 and includes a dust-precipitating means comprising a plurality of spaced non-discharging plates, adjacent ones of which are relatively insulated to provide two series, one of which is grounded and the other of which is connected to the ungrounded pole of a grounded source of energy for creating an electrostatic field between adjacent plates which consequently constitute specific forms of dust-precipitating electrodes.

Referring more particularly to Fig. 2, the plates are shown in a dust-precipitating means in the form of a cage structure electrode-assembly comprising a plurality of grounded planar plates 22 forming the series of uninsulated plates, and a plurality of insulated planar plates 24 forming the other series. In the embodiment shown, the plates are secured together so that they can be rotated in unison by means of rods 26 having nuts 28 threaded on both ends. The rods extend through suitable aligned apertures in the plates which are maintained in suitable spaced relation by suitable insulating spacers 30 and 32 provided with elongated creepage paths. The spacers 30 have central protuberances of a diameter larger than that of the rods 26. The insulated plates 24 are suitably apertured to receive the protuberances on the spacers 30 while the grounded plates 22 are provided with apertures which snugly fit the rods 26 so as to provide good electrical contact therewith, the rods being of metal. The plates and spacers are clamped with grounded plates on the outside of the electrode-assembly, by tightening the nuts 28. Another form of a dust-precipitating electrode assembly which can be adapted to the invention of the instant application is shown in my patent application Serial No. 382,852, filed March 12, 1941.

Secured to the outer grounded plates are protruding trunnion shafts 40 and 42 passing through the opposite vertical walls 44 of the conduit means 2, suitable gas-tight packing glands 46 being provided to limit gas leakage. The shaft 40 is rotatably mounted in a bearing 50; while the shaft 42, rotatably mounted in a bearing 52, has keyed thereto a gear 54 adapted to be geared to any speed reducing mechanism which may be driven manually, or by a variable speed motor 56, to rotate the electrode-assembly clockwise, with reference to Figs. 1 and 3, about a substantially horizontal axis perpendicular to the planes of the plates, which are vertical. In Fig. 1, the axis of rotation includes the axes of the shafts 40 and 42 which are preferably arranged at the center of the electrode-assembly. In some cases, particularly in smaller sized precipitators, the electrode-assembly can be suitably rotated by hand.

Ionizing potential is applied to the ionizing wires 16 by an insulated lead 60 passing through a side of the conduit means 2 and conductively attached to the metallic skeleton frame 18 which is conductively bridged to the remaining skeleton frames; and a potential is applied to the insulated plates 24 by securing to each of them a conductive contactor 62 of springy material, these contactors in the normal position of the electrode-assembly rubbing against and contacting an elongated stationary contact 64 mounted on insulators 66 secured to an insulating air-directing baffle 68 attached to and extending across the conduit means 2. An insulated lead 70 passes through the conduit means 2 and is connected to the stationary contact 64. Two contactors 62 are provided at diagonally opposite corners of each of the insulated plates so that one of them contacts the contact 64 in either vertical position of the plates, permitting the plates to be left stationary in either of the two vertical positions of the electrode-assembly. The ground electrodes 14 and the grounded plates 22 are conductively connected to the conduit means 2 which is grounded; the plates 22 being conductively connected to the conduit means 2 through the rods 26, the shafts 40 and 42 and their supporting structure.

The ionizing means and precipitating means are energized from any suitable source of electrical power 72 controlled by a manually operated or automatically time-controlled three-way switch means 74. With reference to Fig. 6, in the lowermost position of the switch means 74, the blower motor 12, for causing a gas-flow through the conduit means, is energized and a power pack 76 is also energized for converting the commercial voltage into suitable unidirectional high voltages at the leads 60 and 70 for application to the ionizing wires 16 and insulated high-voltage plates 24, respectively; the energizing circuits having one end grounded as at 78 to complete their paths to the grounded conduit means 2. With the switch means in this lowermost position, the parts of the precipitator are all stationary except the blower means, and the gas-borne dust passing through the ionizing zone A is unidirectionally charged. For cleaning air, the wires are preferably positively charged. In passing through the precipitating zone B, the charged dust is precipitated. An insulating baffle 79 supplements the insulating baffle 68, both of which divert the gas stream from the upper end of the conduit means. If desired, additional vertical gas-flow directing baffles may be secured to the upright sides 44 of the housing.

During gas-cleaning, the portion of the plates of the dust-precipitating electrode-assembly, which is above the level of the oil 10, comprises spaced dust-collecting surfaces, since these are in the path of the gas-flow; while the portion below the liquid level is immersed in the oil. When the electrode-assembly is energized by the application of power from the power pack, an electrostatic field is established between the facing surfaces of the portion of the adjacent plates in the gas-cleaning section of the housing, and an electrostatic field is also established between the facing surfaces of the portion of the plates in the insulating oil 10.

When it is desired to wash off the precipitated dust which has accumulated on the gas-cleaning portion of the electrode-assembly, the switch means 74 is moved to its uppermost position for deenergizing the blower motor 12, the ionizing means and the precipitating means, and for energizing the motor 56 which is geared to the gear 54 and causes rotation of the electrode-assembly in a clockwise direction; the contactors 62 flexing to enable them to move past any obstructions they may engage. During rotation of the electrode-assembly, the collected dust is washed and flushed off the plates, the portion of the plates dipping in the liquid being directly washed while the portion of the plates in proximity to the shafts 40 and 42 being flushed by liquid flowing over them, this flow of liquid being made more copious by the provision of scoops 80 across the electrode-assembly, secured to the grounded plates. These scoops scoop washing liquid up during the rotation of the electrode-assembly and spread liquid over its dust-collecting surfaces. During the washing of the plates, it is desirable to vary the speed of the motor 56 to insure a thorough flushing of the dust-collecting surfaces.

By moving the dust-collecting plates edgewise through the cleaning liquid, the dirt on the plates can be effectively washed off with relatively low linear speeds. A relative speed of about 15 feet per minute will yield very good cleaning of the plates in a few minutes. With lower speeds the cleaning operation should continue for greater time periods. However, I do not wish to be limited to any particular speed of relative movement between the plates and the oil so long as the oil flushes the plates, with fresh oil being supplied and continually moved over each spot of the plates.

By introducing a relative velocity between the plates and oil the part of the dust deposit contiguous to the dust-collecting surfaces of the plates can be removed as well as the relatively loosely attached dust. On the other hand, for the embodiment as shown in Fig. 1, too high a rotational velocity of the plates should not be used in order to prevent the oil from being thrown out of the electrode-assembly by excessive centrifugal action, but by placing the shafts about which the plates revolve, closer, or even slightly under the oil level, substantially the entire surface of the plates will be immersed in the body of oil 10.

After a suitable interval of time, 5 to 8 minutes usually being sufficient, the switch means 74 is put in its middle position in which parts are de-energized and inoperative. By means of any suitable indicator system, such as, for example, an indicator on a shaft 40 or 42, or a signal light indicating contact between contactors 62 and contact 60, the electrode-assembly may be restored to its proper vertical gas-cleaning position. Excess oil on the dust-collecting surfaces of the plates drains into the container 8 leaving a thin film or coat on the plates for causing adhesion of the dust-particles to be subsequently removed from the gas to be passed through the conduit means 2. After a short time for draining, the switch means 74 may be again placed in its lowermost position for restarting the gas-cleaning operation of the precipitator. I have found that cleaning the plates once or twice a day, or even less, is usually ample for ordinary air cleaning, although the plates may be cleaned more often if the air has relatively heavy dust concentrations.

In the modification described in Figs. 1 and 2, only the dust-precipitating means, comprising the plates 22 and 24, is rotated for removing accumulated dust, but in the modification shown in Fig. 3 the ionizing means, including the ground electrodes 14' and the ionizing wires 16', is also washed. This is accomplished by connecting the different items of the ionizing means to selected grounded plates 22', which project slightly beyond the insulated plates, by means of suitable metal brackets 82. In this embodiment, the ionizing wires are energized by means of a springy contactor 84 connected to the skeleton frame 18 which supports the ionizing wires. The contactor 84 is adapted to wipe against a stationary slightly flexible contact 86 mounted on the insulator 88 secured to an insulating baffle 89, high potential being supplied to the contact 86 in any suitable manner. A sufficient number of contactors 84 and contacts 86 are provided to energize all of the ionizing wires; although conducting bridging bars may also be used for electrically connecting all of the frames 18 so that a single contactor 84 and a single contact 86 will suffice. The ground electrodes 14' are, of course, conductively connected to the grounded plates 22' which in turn are grounded through the trunnion shafts and conduit means.

The embodiment of Figs. 3 and 4 also differs somewhat from that of Figs. 1 and 2 in that the top ends of all of the dust-collecting plates are curved along an arc of the circle which each generates during rotation, the center of the circles being the trunnion shafts which in this case are disposed somewhat to the right of the center of the plates to accommodate the added ionizing means supported by the grounded plates.

A further embodiment of my invention is schematically shown in Fig. 5, in which the dust-precipitating electrode-assembly comprises grounded plates 90 and insulated plates 92 clamped together on four rods as in the other embodiments. However, in the instant embodiment, the electrode-assembly is mounted for rotation about a horizontal axis below the grounded plates and perpendicular thereto, as indicated by the shaft 94 which may extend across the conduit means 2. In this embodiment, the entire area of the dust-collecting surfaces of the plates is disposed in the gas-cleaning section of the housing when used for cleaning gas, and during the electrode-cleaning operation the entire electrode-assembly moves through the oil. Consequently, the scoops 80 can be omitted and a removable split heat-resistant fire-prevention cover 96 provided for covering the oil while the precipitator is cleaning gas. The cover may be made of metal, asbestos sheet, or any other suitable material.

In the embodiment of Fig. 5, the dust-collecting surfaces of the dust-precipitating electrodes move completely through the body of oil 10. Consequently, higher rotational velocities can be imparted to the electrode-assembly, as compared to the embodiments of Figs. 1 and 3. In such cases, it may be desirable to use an open louver, or pivoted vane oil-deflecting means as more particularly shown and described in connection with the embodiment of Fig. 8. Obviously, the ionizing means for the embodiment of Fig. 5 also can be supported on the grounded plates 92 for rotation with the electrode assembly, and thus be cleaned.

In accordance with my invention, the accumulated dust layer on the dust-precipitating electrodes is removed by exerting a removing force on the dust layer, and in the embodiment of Fig.

5 this is obtained by moving the plates edgewise through the oil 10 in the tank 8. However, it is also possible to move the oil with respect to the plates and in Fig. 7 such an embodiment is shown. In this embodiment, the dust-precipitating electrode-assembly comprises a shaft 94' substantially at the boundary of the gas-stream and oil level. Portions 97 and 99 of the dust-precipitating means are carried on opposite sides of the shaft 94', each of these portions 97 and 99 being somewhat similar to the electrode-assembly comprising the relatively insulated and uninsulated plates 90 and 92 of the embodiment shown in Fig. 5. However, each insulated plate 100 of each portion is provided with a lug or ear 102 extending beyond the grounded plates. The grounded plates, in all embodiments, are preferably larger than the insulated plates, but of similar contour, with the grounded plates projecting beyond the insulated plates. An end one of these insulated plates 100 (Fig. 9) is provided with a rigidly connected brush or contactor 104 adapted to engage a springy contact 106 insulatedly supported by an insulator 107 in a depressed section 108 of the housing 2. The depressed section 108 is preferably formed of insulating material 110 through which passes the lead 70 which is connected to the contact 106. A connecting wire 112 passes through holes in each of the lugs 102 on the insulated plates 100, and is conductively connected to each of the lugs so that the potential supplied by the lead 70 is conveyed to all of the insulated plates, as more particularly shown and claimed in my aforesaid patent application Serial No. 382,852, filed March 12, 1941.

The container 8 may also be provided with an insulating depressed section 108', similar in construction and arrangement to the depressed section 108, also having an insulated energizing contact 106' adapted to be contacted by a contactor 104 on an insulated plate.

The embodiment shown in Fig. 7 is particularly useful for installations in which it is impractical to interrupt the gas flow or to interrupt it for more than a moment or so.

In order to cause a forcible flow of oil across and between the dust-collecting plates, an oil pumping means is provided comprising an oil pump 120 having a discharge pipe 122, and an oil-distributing chamber 124 at a side 126 of the oil container 8. This distributing chamber 124 is provided with a plurality of spaced distributed apertures 128 in the side 126 for distributing the oil flow to the dust-precipitating electrodes in a manner to cause an edgewise flow of the oil into the spaces between the dust-precipitating electrodes. To facilitate this edgewise flow, an oil-directing baffle 129 is provided across the container 8 immediately under the plate-electrodes, and an oil-receiving chamber 130 is provided on a side 132 of the container 8, opposite to the side 126; the chamber having a plurality of distributed oil-receiving apertures 134 and an oil intake pipe 136 for the pump 120.

In the preferred operation of the embodiment shown in Fig. 7, the upper portion of the dust-precipitating means, which is in the gas-cleaning section of the housing 2, is energized; and the lower portion, which is in the body of oil 10, may be deenergized. After the upper portion has been in operation for some time, the position of the two portions is reversed, either automatically or manually. When a portion of the dust-precipitating means moves to gas-cleaning position in the gas-cleaning section of the housing 2, its contactor 104 engages the contact 106 so that the only time the dust-precipitating means is deenergized is during the time required to move through a part of a turn, which in the structure shown, is one-half of a revolution.

Upon reversal of the electrode-assemblies, the dust-laden portion of the dust-precipitating means is disposed in the oil in the container 8 and can be forcibly cleaned by starting the pump 120 which causes a flow of oil from the oil-distributing chamber 124 to the oil-collecting chamber 130, the oil flushing the dust layer from the dust-collecting surfaces of the plates. The refractory cover 96, which is preferably heat insulating, is, of course, removed to permit the turning of the electrode-assemblies, and then restored to covering position after the movement has been completed, but the cover can be omitted if desired. The pump system should preferably have sufficient capacity to cause a movement of a sufficiently large volume of oil between the plates of the electrode-assembly with some force so as to wipe the dust layer from the dust-collecting surfaces of the plates. As a rule, cleaning the plates with moving oil requires a longer time than continuously rotating the electrode-assembly through the oil.

Fig. 10 indicates schematically an energizing circuit for the embodiment of Fig. 7 when operating as just described. The blower motor 12 and the power pack 76 are continually energized. The shaft 94' is rotated counterclockwise by a motor 138 controlled by a switch means 140. Obviously, any suitable device can be used to assure proper positioning of the dust-precipitating means. Limit switches, Geneva movements, indicators and other common expedients are obvious and it is not considered necessary to burden this application with disclosures thereof.

Since the oil in the container 8 is insulating, the power pack 76 need not be deenergized, and the short time required to move an electrode-assembly does not seriously affect the cleaning of the gas. However, if it is desired to continue the gas-cleaning operation even while the shaft 94' is being moved, the contact 106 may be made in the form of an annular member 141 in a similar insulating chamber 142 (Fig. 11), and the trailing edges of the plates extended along their path of rotation.

Where interruption of the gas-cleaning operation can be tolerated for some time so that the gas-flow can be shut off, or where the precipitator system comprises a plurality of units enabling the gas-flow through one unit to be shut off while the others clean gas, the dust-collecting surfaces of a dust-laden electrode-assembly portion can be cleaned either by pumping oil between the plates, or by continuously rotating the dust-precipitating means of the unit after the manner taught for the embodiment shown in Fig. 5, the former however generally requiring a longer cleaning period.

To adapt the embodiment of Fig. 7 to either mode of operation, a switch 143 may be provided by means of which the blower motor 12 and power pack 76 for the unit may be deenergized.

Fig. 8 discloses an embodiment similar to that of Fig. 7 with the pumping system for moving the oil relative to the dust-collecting plates removed. The dust-precipitating means of Fig. 8 can be cleaned by relative movement of the plates and oil resulting from rotating the electrode-assemblies about the shaft 94''. The embodiment then resembles that of Fig. 5. Pivoted vanes 144 when open permit gas-flow, and when closed during electrode-cleaning bar oil from splashing along the gas-ducts or out of the precipitator-unit. Any oil sprayed on the closed vanes will obviously drain back to the container.

I prefer to operate this embodiment with the plates in the oil charged, establishing an electrostatic field between adjacent plates. To this end, the lower portion of the dust-precipitating means, which is disposed in the oil 10 while the upper one is cleaning air, is continually electrically energized, the insulated plates being energized through contact 106' in the insulated depressed section 108'. As disclosed in my patent application Serial No. 363,442, filed October 30, 1940, and assigned to the Westinghouse Electric & Manufacturing Company, an electrostatic field of proper intensity between alternately insulated and uninsulated plates in oil causes a cleaning action to occur which causes the dirt or dust in the oil more rapidly to settle downwardly, thereby cleaning the oil. A potential equal to that applied between the plates in the gas-cleaning section of an air-cleaning precipitator may be used, but a much lower potential is preferable for closely spaced plates. Consequently, a separate conductor is connected to the contactor 106' so that a suitable source of electrical energy can be connected across the adjacent plates of the section in the oil. With identical electrode-assemblies on each side of the shaft of Fig. 8, either one or both may be used for air-cleaning. If both are used it is desirable to rotate the shaft for cleaning the dust-collecting electrodes just before the positions of the electrode-assemblies are reversed. A sump 145 is provided to collect the sludge sliding down the plates in the oil. A longer time is required for cleaning oil than for cleaning the electrodes, but ample time is available between electrode-cleaning operations.

Oil-cleaning action, which takes place when the relatively insulated and uninsulated plates in the oil are energized, also occurs in other embodiments disclosed herein, but it is desirable when the precipitators are so operated to cause a material flow of oil between the oil-cleaning plates for a short time before they are moved from oil-cleaning position to air-cleaning position in the precipitator. This is most conveniently done by carrying out the electrode-cleaning operations just before the electrode-assemblies are reversed, or the position of the electrode-assembly of the embodiment of Fig. 1 reversed. For so adapting the embodiment shown in Fig. 7, the oil-pumping operations are preferably carried out either just before the electrode-assemblies are reversed, or a short pumping operation then carried out, and a more extended pumping operation at some time during a gas-cleaning interval during which the electrode-assemblies are stationary.

The embodiment shown in Fig. 8 is readily changeable to one substantially similar to that of Fig. 5 by omitting one of the electrode-assembly portions. Electrode-cleaning can then be effected quickly during gas-flow shut-down by rotating the remaining electrode-assembly.

It is possible, however, to use relative movement of the oil and plates to effect electrode- or plate-cleaning and effect electrical oil-cleaning between electrode-cleaning intervals by keeping an energized dust-precipitating electrode-assembly in the oil in the electrode-cleaning section of the housing. In such case, the same electrode-assembly is always used for air-cleaning, and a more suitably designed electrode-assembly used for oil-cleaning, attached to the shaft if desired. In the various embodiments, any suitable means may be provided for changing the oil or removing the sludge which is formed therein by the dust removed from the plates.

In Figs. 7 and 8, the sludge may settle into sumps and may be occasionally removed through the expedients of a plurality of drain plugs 152 or a removable plate 154, or by any other suitable means. In structures using an oil pump, an oil filter can be inserted in the oil-pipes.

Generally, vertically or upstandingly disposed plates are preferred. Upright plates permit a more effective draining of the oil, leaving only a thin film of oil thereon, which is all that is required; and also encouraging sludge to slide down the plates used for cleaning the oil.

In air-cleaning precipitators in which the plates are closely spaced, in the order of $\frac{1}{16}$" or thereabouts, moving the oil relatively edgewise between the plates of the electrode-assembly assures an effective removal of the precipitated dust which would be otherwise difficult to achieve automatically because of the close spacing of the plates. In instances where it is desired to clean the ionizing electrodes also, ionizing means may be secured to the grounded plates, and both the ionizing means and the dust-precipitating means moved to the electrode-cleaning section of the precipitator.

While I have shown my invention in various forms and embodiments, it is obvious that the teachings of my invention are widely applicable to other forms and embodiments of electrical precipitators, and that many modifications may be employed and utilized.

I claim as my invention:

1. An electrical precipitator for removing dust-particles from a flowing gas by electrically charging and precipitating the dust-particles; comprising dust-precipitating means upon which the precipitating dust-particles deposit, said means including a plurality of spaced generally vertically directed dust-collecting plates having extensive dust-collecting surfaces paralleling the gas-flow, said dust-collecting plates being arranged to provide generally vertical, horizontally displaced strata of gas-flow; a container below said surfaces for holding oil for washing the accumulated dust from said surfaces; and means for rotatably supporting said plates for rotation of said surfaces in said oil about a generally horizontal axis with each point in said dust-collecting plates describing a circle during rotation, the dust-collecting surfaces being in contact with said oil for cleansing during rotation, said axis being generally perpendicular to said strata.

2. A device of the class described for removing dust-particles from a flowing gas by electrically charging and precipitating the dust-particles; comprising dust-precipitating means upon which the precipitating dust-particles deposit, said dust-precipitating means including a plurality of spaced dust-collecting plates, adjacent ones of which are relatively insulated to form two series of relatively insulated plates, said plates having substantially planar dust-collecting surfaces in the gas-flow, means for establishing an electrostatic field between the two series of plates, a body of oil below said plurality of plates, and means for moving said plurality of plates in said body of oil for wiping precipitated dust from said dust-collecting surfaces, said dust-precipitating means having means for supporting said plates so that said dust-collecting surfaces are always in substantially vertical planes, whereby said plates can be moved edgewise through said body of oil.

3. In a device of the class described generally having an ionized zone and a precipitating zone successively in the path of a gas-flow for removing dust-particles from the gas; ionizing means for charging the dust-particles, said ionizing means comprising a non-discharging ground electrode and a cooperating discharging electrode in the path of the gas-flow; a dust-precipitating means following said ionizing means in the direction of gas-flow, said dust-precipitating means including a plurality of spaced plates, adjacent ones of which are relatively insulated to form two series of relatively insulated plates, said plates having substantially planar dust-collecting surfaces paralleling the gas-flow; means for applying a potential between the said two series of plates and a potential between said ground electrode and said discharging electrode; an oil-container below said plurality of plates and said ionizing means; means for moving said plurality of plates and said ground electrode in the oil in said container for wiping collected dust from said surfaces and said ground electrode, said dust-precipitating means having means for supporting said ground electrode by said plates, and for supporting said plates so that said dust-collecting surfaces are always in substantially vertical planes during their movement, whereby said plates can be moved edgewise through said oil.

4. A device of the class described for removing dust-particles from a flowing gas by electrically charging and precipitating the dust-particles, comprising substantially horizontal conduit means for the gas-flow, ionizing means in said conduit means for charging the dust-particles in the gas-flow; dust-precipitating means in said conduit means following said ionizing means in the direction of gas-flow, said dust-precipitating means comprising a plurality of spaced, generally vertically directed plates having dust-collecting surfaces substantially paralleling the gas-flow, adjacent ones of said plates being relatively insulated, said plates being arranged to provide generally vertical, horizontally displaced strata of gas-flow, an oil-container below said plurality of plates, and means for supporting said plurality of plates with said surfaces above said oil-container, the last said means rotatably supporting said plates for rotation into said container, about a generally horizontal axis generally perpendicular to said plates, whereby said surfaces may be oil-washed in said container.

5. A device of the class described for removing dust-particles from a flowing gas by electrically charging and precipitating the dust-particles, comprising horizontal conduit means for the gas-flow, ionizing means in said conduit means for charging the dust-particles in the gas-flow; dust-precipitating means in said conduit means following said ionizing means in the direction of gas-flow, said dust-precipitating means comprising a plurality of spaced, generally vertically directed plates having dust-collecting surfaces of extensive area substantially paralleling the gas-flow, adjacent ones of said plates being relatively insulated, said plates being arranged to provide generally vertical horizontally displaced strata of gas-flow, means for applying a potential between relatively insulated plates, a container below said plates for holding oil for washing said plates, means for rotating said dust-collecting surfaces through said oil about a generally horizontal axis generally perpendicular to said surfaces, and movable refractory cover means for said container.

6. An electrical precipitator for removing dust-particles from a flowing gas by electrically charging and precipitating the dust-particles, comprising dust-precipitating means upon which the precipitating particles deposit, said dust-precipitating means including a plurality of alternately insulated and uninsulated spaced generally vertically directed dust-collecting plates having dust-collecting surfaces substantially paralleling the gas-flow, and being arranged to provide generally vertical, horizontally displaced strata of gas-flow, means for supporting said plates for rotation about a substantially horizontal axis generally perpendicular to said strata; and means for oil washing said surfaces during rotation of said plates.

7. In a device of the class described generally having an ionized zone and a precipitating zone successively in the path of a gas-flow for removing dust-particles from the gas, ionizing means for charging the dust-particles, said ionizing means comprising a non-discharging relatively large curved electrode and a relatively small discharging electrode insulated from said curved electrode, a dust-precipitating means following said ionizing means in the direction of gas-flow, said dust-precipitating means including a plurality of spaced dust-collecting plates, adjacent ones of which are relatively insulated, said plates having dust-collecting surfaces substantially paralleling the gas-flow, and being arranged to provide generally vertical, horizontally displaced strata of gas-flow, means for supporting said plates and said curved electrode for rotation about a substantially horizontal axis generally perpendicular to said strata; and means for oil washing said surfaces during rotation of said plates.

8. An electrical precipitator for electrostatically removing dust-particles from a dust-carrying gas flowing through said precipitator, said precipitator comprising housing means through which the gas flows, said housing means having a gas-cleaning section and an electrode-cleaning section, dust-charging means, dust-precipitating means for electrically removing charged gas-borne particles from the gas-stream, said dust-precipitating means comprising a plurality of spaced dust-collecting electrode-means having dust-collecting surfaces, means for moving said dust-collecting electrode-means along a fixed predetermined path from the gas-cleaning section to said electrode-cleaning section and back to said gas-cleaning section of said housing means, means for establishing electrostatic dust-precipitating fields in the spaces between said dust-collecting electrode-means when said dust-collecting electrode-means are in said gas-cleaning section, and means for causing, for an electrode-cleaning time interval, relative continuous movement of cleaning oil with respect to said surfaces of said dust-collecting electrode-means when the dust-collecting electrode-means are in said electrode-cleaning section, the quantity of the oil being sufficient to substantially fill the spaces between the dust-collecting electrode-means, whereby to forcibly remove dust which has been precipitated on said dust-collecting electrode-means in said gas-cleaning section.

9. An electrical precipitator for removing dust-particles from a dust-carrying gas flowing through said precipitator, said precipitator comprising housing means through which the gas flows, said housing means having a gas-cleaning section in the gas stream and an electrode-cleaning section out of the gas stream, dust-removing means for electrically charging and precipitating gas-borne particles from the gas stream, said dust-removing means comprising a plurality of spaced dust-collecting electrode-means having dust-collecting surfaces, means for moving said dust-collecting electrode-means along a fixed predetermined path from the gas-cleaning section to said electrode-cleaning section and back to said gas-cleaning section of said housing means, said dust-removing means comprising means for establishing electrostatic dust-precipitating fields in the spaces between said dust-collecting electrode-means when said dust-collecting electrode-means are in said gas-cleaning section, an oil-holding means, and means for causing a flow of oil, in material amounts, and at material velocities, over the dust-collecting surfaces of said dust-collecting electrode-means when in said electrode-cleaning section, whereby adhering dust is forcibly flushed from said dust-collecting surfaces.

10. An electrical dust-precipitator for removing dust-particles from a flowing dust-carrying gas, comprising housing means through which the gas flows, ionizing means for charging the dust-particles in the gas-stream, dust-precipitating means in said housing means after said ionizing means in the direction of gas-flow for electrically precipitating charged dust-particles flowing therethrough, said dust-precipitating means comprising a plurality of dust-collecting portions, each portion comprising a plurality of spaced, alternately relatively insulated and uninsulated electrode-means having dust-collecting surfaces paralleling the gas-flow, said housing means having a gas-cleaning section and an electrode-cleaning section, means for supporting said dust-precipitating means so that each of its dust-collecting portions can be moved along a fixed predetermined endless path from said gas-cleaning section to said electrode-cleaning section and back to said gas-cleaning section of said housing means, said electrode-cleaning section being below said gas-cleaning section, oil-container means including oil in said electrode-cleaning section, into which each dust-collecting portion is moved, and means for oppositely electrically charging the said relatively insulated and uninsulated electrode-means of each dust-collecting portion, when it is in said gas-cleaning section and when it is in said oil.

11. An electrical precipitator for electrostatically removing dust-particles from a gas flowing through said precipitator, said precipitator having a gas-cleaning section and an electrode-cleaning section, dust-charging means, dust-precipitating means comprising a plurality of spaced dust-collecting plates, said plurality of dust-collecting plates having a portion in said gas-cleaning section for dividing the gas-flow into a plurality of gas-passages, supporting means for supporting said portion of said dust-collecting plates so that said portion can be passed along a predetermined fixed endless path from said gas-cleaning section to said electrode-cleaning section and back to said gas-cleaning section of said precipitator, said electrode-cleaning section of said precipitator having oil-holding means for receiving said portion of said dust-collecting plates, said supporting means supporting said portion of said dust-collecting plates when it is in said electrode-cleaning section so that the said portion of dust-collecting plates can be moved edgewise through cleaning oil of said oil-holding means, whereby to remove precipitated dust from said dust-collecting plates.

12. An electrical precipitator for electrostatically removing dust-particles from a gas flowing through said precipitator, said precipitator having a gas-cleaning section and an electrode-cleaning section, means for charging dust-particles in the gas-flow, and precipitating charged dust-particles, comprising dust-precipitating means comprising a plurality of spaced dust-collecting plates adjacent ones of which are relatively insulated, said plurality of dust-collecting plates having a portion in said gas-cleaning section dividing the gas-flow in said gas-cleaning section into a plurality of horizontally-displaced gas-passages, supporting means for supporting said portion of said dust-collecting plates so that said portion can be passed repeatedly along a predetermined fixed path from said gas-cleaning section into said electrode-cleaning section and back to said gas-cleaning section of said precipitator, means for electrically energizing said portion of said dust-collecting plates when in said gas-cleaning section for oppositely charging the relatively insulated dust-collecting plates thereof, and means for causing, in said electrode-cleaning section, a relative movement of oil and the portion of the dust-collecting plates in said electrode-cleaning section, the last said means causing a flow of liquid relative to the last said dust-collecting plates such that the spaces between the last said dust-collecting plates are substantially full of relatively flowing liquid, whereby to forcibly flush adhering dust-particles from the last said dust-collecting plates.

13. An electrical precipitator for electrostatically removing dust-particles from a gas flowing through said precipitator, said precipitator having a gas-cleaning section and an electrode-cleaning section, dust-precipitating means comprising alternately relatively insulated and uninsulated dust-collecting electrode-means, said dust-collecting electrode-means comprising a plurality of spaced dust-collecting plates, said plurality of dust-collecting plates having a portion in said gas-cleaning section dividing the gas-flow into a plurality of layers, supporting means for supporting said portion of said plurality of dust-collecting plates so that it can be passed repeatedly along a predetermined fixed path from said gas-cleaning section to said electrode-cleaning section and back to said gas-cleaning section of said precitator, means for oppositely charging the relatively insulated and uninsulated dust-collecting electrode-means when in said gas-cleaning section, said electrode-cleaning section having oil-holding means adapted to receive a plurality of said dust-collecting plates, and independent force means for causing a forced flow of oil between the spaces of dust-collecting plates in the said electrode-cleaning section, to forcibly remove precipitated dust therefrom, the flowing oil substantially filling the said spaces.

14. An electrical dust-precipitator for electrostatically removing dust-particles from a flowing gas, said dust-precipitator comprising a gas-conduit means having a gas-cleaning section, dust-precipitating means comprising a plurality of electrode-assemblies, each of said electrode-assemblies comprising a plurality of spaced alternately relatively insulated and uninsulated dust-collecting plates, a liquid container below said gas-cleaning section, for holding a body of an insulating liquid, said dust-precipitating means having an electrode-assembly in said gas-cleaning section and another electrode-assembly in said body of insulating liquid, and means for applying potential to the electrode-assembly which is in said liquid so that its relatively insulated dust-collecting plates are charged with respect to its relatively uninsulated dust-collecting plates.

15. An electrical dust-precipitator for electrostatically removing dust-particles from a flowing gas, said dust-precipitator comprising a gas-cleaning section and an electrode-cleaning section, particle-charging means, dust-precipitating means for precipitating charged dust-particles, said dust-precipitating means comprising a plurality of spaced, alternately relatively insulated and uninsulated dust-collecting plates dividing the gas-flow therethrough into a plurality of layers, means for moving said dust-collecting plates repeatedly in fixed predetermined paths from said gas-cleaning section to said electrode-cleaning section and back to said gas-cleaning section of the precipitator, cleaning means for removing precipitated dust from dust-collecting plates in said electrode-cleaning section, said cleaning means comprising a container having a body of oil adapted to clean the last said dust-collecting plates, and electrostatic means for causing dust in said oil to settle to the bottom of said container, said electrostatic means comprising a plurality of alternately relatively insulated and uninsulated electrodes.

16. An electrical dust-precipitator for electrostatically removing gas-borne dust-particles from a gas flowing through said precipitator, said precipitator comprising a gas-cleaning section and an oil container below said gas-cleaning section, dust-charging means, a dust-precipitating means for precipitating charged dust-particles and collecting the precipitated dust-particles, said dust-precipitating means comprising a plurality of spaced, alternately relatively insulated and uninsulated dust-collecting plates, a portion of said plurality of plates being in said gas-cleaning section while another portion of said plurality of plates is in said container, means for removing precipitated dust from the portion of said plurality of plates in said container with the oil therein, means for repeatedly causing a reversal of the relative positions of said portions of said plurality of plates after an interval of time by moving the plates in a fixed endless path, and means for electrostatically cleaning the oil during said interval of time.

17. An electrical precipitator device for removing dust-particles from a gas flowing through said device by charging dust-particles and precipitating the charged dust-particles; said precipitator comprising a gas-cleaning section and an electrode-cleaning section, an ionizing means comprising a plurality of electrode-means for charging gas-borne dust-particles, a dust-precipitating means comprising a plurality of dust-collecting electrode-means for collecting charged dust-particles, means for supporting said electrode-means of said ionizing means and of said dust-precipitating means for repeated movement in fixed predetermined paths from said gas-cleaning section to said electrode-cleaning section and back to said gas-cleaning section of said precipitator, and means in said electrode-cleaning section for removing dust on said electrode-means of said ionizing means and of said dust-precipitating means.

18. An electrical precipitator for removing dust-particles from a gas flowing through said precipitator, said precipitator having a gas-cleaning section in the gas-stream and an electrode-cleaning section out of the gas-stream, dust-charging means, dust-precipitating means comprising a plurality of spaced relatively insulated and uninsulated dust-collecting plate-electrodes, said plurality of dust-collecting plate-electrodes having a portion in said gas-cleaning section dividing the gas-flow into a plurality of relatively thin layers, supporting means for supporting said portion of said plurality of plate-electrodes so that it can be moved along a predetermined fixed endless path from said gas-cleaning section to said electrode-cleaning section and back to said gas-cleaning section of said precipitator, means for electrically energizing said portion while in said gas-cleaning section for oppositely charging the relatively insulated and uninsulated dust-collecting plate-electrodes thereof, an oil-holding container, and separate pump means for pumping oil of said container between the spaces of said portion of said plurality of plates when it is in said electrode-cleaning section, in such quantity as to forcibly flush precipitated dust from them.

19. An electrical precipitator for removing dust-particles from a gas flowing through said precipitator by electrically charging gas-borne dust-particles and precipitating the charged dust-particles; said precipitator having a gas-cleaning section and an electrode-cleaning section, dust-precipitating means comprising a plurality of relatively closely spaced dust-collecting plate-electrodes, supporting means for supporting said dust-collecting plate-electrodes for repeated movement in a predetermined fixed endless path from said gas-cleaning section to said electrode-cleaning section and back to said gas-cleaning section of said precipitator, pump means for pumping oil between the spaces of dust-collecting plate-electrodes in said electrode-cleaning section whereby to forcibly flush precipitated dust from them, and distributing means for distributing the oil pumped by said pump means, across the edges of the last said dust-collecting plate-electrodes.

20. An electrical precipitator for removing dust-particles from a gas flowing through said precipitator by electrically charging gas-borne dust-particles and precipitating the charged dust-particles; said precipitator having a gas-cleaning section and an electrode-cleaning section, dust-precipitating means comprising a plurality of relatively closely spaced dust-collecting plates, supporting means for supporting said dust-collecting plates for repeated movement in a predetermined fixed endless path from said gas-cleaning section to said electrode-cleaning section and back to said gas-cleaning section of said precipitator, said electrode-cleaning section comprising an oil-holding means adapted to receive said dust-collecting plates, and means for forcing oil of said oil-holding means through said plurality of dust-collecting plates, when in said electrode-cleaning section, the oil being forced through said plurality of dust-collecting plates from one edge to the opposite edge thereof, the quantity of oil being sufficient to substantially fill the spaces between said dust-collecting plates.

21. An electrical dust precipitator for removing gas-borne dust-particles from a gas flowing through said precipitator by charging the dust-particles and precipitating the charged dust-particles, said precipitator comprising a gas-cleaning section and an oil-holding means below said gas-cleaning section, a dust-precipitating means for precipitating and collecting dust-particles, comprising a plurality of spaced relatively insulated and uninsulated dust-collecting plates, a portion of said plurality of plates being in said gas cleaning section, and another portion of said plurality of plates being in the oil of said oil-holding means, means for causing a reversal of the dispositions of said portions, and means for energizing said precipitating means for establishing electrostatic fields between adjacent ones of said plurality of plates in both said gas-cleaning section and in said oil.

22. An electrical precipitator device for removing dust-particles from a gas flowing through said device, by charging dust-particles and precipitating the charged dust-particles, said device comprising a gas-cleaning section and an electrode-cleaning section, means, comprising a plurality of separate electrodes, for charging dust-particles in the gas-stream and for precipitating charged dust-particles, means for moving all of said plurality of separate electrodes in fixed paths from said gas-cleaning section to said electrode-cleaning section and back to said gas-cleaning section, and means in said electrode-cleaning section for cleaning said electrodes.

GAYLORD W. PENNEY.